United States Patent [19]

Lew

[11] Patent Number: 4,628,961
[45] Date of Patent: Dec. 16, 1986

[54] MULTIPLE ORIFICE STEPPER CONTROL VALVE

[76] Inventor: Hyok S. Lew, 7890 Oak St., Arvada, Colo. 80005

[21] Appl. No.: 777,753

[22] Filed: Sep. 19, 1985

[51] Int. Cl.$^4$ .............................................. G05D 7/06
[52] U.S. Cl. .............................. 137/599; 137/625.32
[58] Field of Search ........................... 137/599, 625.32

[56] References Cited

U.S. PATENT DOCUMENTS

| | | | |
|---|---|---|---|
| 1,019,747 | 3/1912 | Barnes | 137/625.32 |
| 1,403,003 | 1/1922 | Beatson | 137/625.32 X |
| 3,282,248 | 11/1966 | Mann et al. | 137/625.32 X |
| 3,726,296 | 4/1973 | Friedland | 137/599 X |
| 3,937,248 | 2/1976 | Hutton | 137/599 X |
| 4,303,097 | 12/1981 | Zerby | 137/599 |
| 4,420,009 | 12/1983 | Sharp et al. | 137/599 X |

*Primary Examiner*—Martin P. Schwadron
*Assistant Examiner*—Stephen M. Hepperle

[57] ABSTRACT

This invention relates to a control valve including a plurality of rotary closure members respectively blocking and opening a plurality of flow passages extending from one port opening to another port opening included in the valve body. Each of the plurality of the rotary closure members includes one or more orifices which open each flow passage blocked by each rotary closure member when the rotary closure member is rotated to the open position, while each rotary closure body closes each flow passage when the rotary closure body is rotated to the closed position. Each rotary closure member includes its own rotary actuator. A controller enables one to selectively open and close different combinations of the rotary closure member, providing flow control means by opening different number of orifices for different amounts of flow rate through the flow passages extending from one port opening to the other port opening included in the valve body.

19 Claims, 4 Drawing Figures

MULTIPLE ORIFICE STEPPER CONTROL VALVE

BACKGROUND OF THE INVENTION

One of the most familiar method of controlling the flow through a pipe line is to install a control valve that provides a variable area of the valve opening by partially opening or partially closing the valve. In such flow control valves wherein the area of the valve opening is varied, the flow of a fluid medium through the valve opening is a complex nonlinear function of the area of the valve opening and, consequently, the flow control valve itself does not provide information on the rate of fluid flow through the flow control valve.

The primary object of the present invention is to provide a flow control valve that has the dual functions of flow control and flow measurement.

Another object is to provide a stepper control valve including a plurality of orifices or nozzles wherein the valve controller closes and opens different numbers of the orifices in a stepwise control of the flow, providing fluid flow proportional to the number of the orifices open in a combination selected by the valve controller.

A further object is to provide a stepper control valve including a plurality of rotary closure members respectively blocking a plurality of flow passages extending from one port opening to the other port opening included in the valve body, wherein each rotary closure member includes a one or more orifices or nozzles which open each flow passage blocked by each rotary closure member when the rotary closure member is rotated to the open position.

Yet another object is to provide a stepper control valve of the aforementioned objects having a plurality of orifices or nozzles of equal throat section area.

Yet a further object is to provide a stepper control valve of the aforementioned objects having a plurality of the orifices or nozzles having different throat section area.

Still another object is to provide a stepper control valve exclusively employing rotary seals only without using any sliding seals.

Still a further object is to provide a stepper control valve of light weight and compact bulk.

These and other objects of the present invention will become clear as the description thereof proceeds.

BRIEF DESCRIPTION OF THE FIGURES

The present invention may be described with a great clarity and specificity by referring to the following figures.

DESCRIPTION OF THE ILLUSTRATIVE EMBODIMENTS

Figure 1:
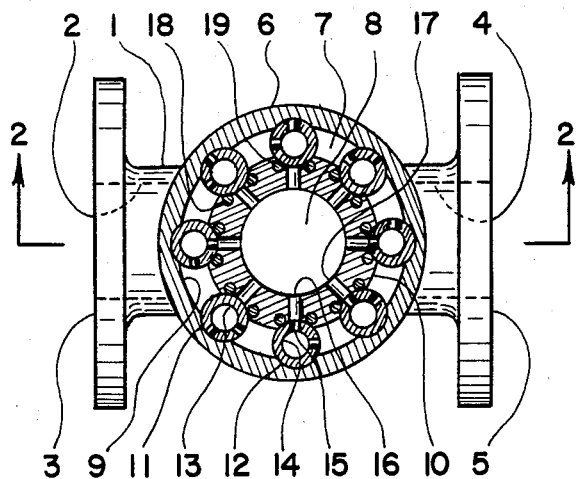
FIG. 1 illustrates a cross section of an embodiment of the stepper control valve constructed in accordance with the principles of the present invention.

In FIG. 1 there is illustrated a cross section of an embodiment of the stepper control valve constructed in accordance with the principles of the present invention. The valve body 1 of the multiple orifice stepper control valve includes a first port opening 2 open to a first extremity 3 of the valve body 1 and a second port opening 4 open to a second extremity 5 of the valve body 1. The valve body 1 includes an extension 6 intermediate the two extremities 3 and 5 of the valve body 1 that includes an annular cylindrical cavity 7 open to the first port opening 2 and an inner cylindrical cavity 8 disposed in a substantially coaxial relationship with respect to the annular cylindrical cavity 7, which inner cylindrical cavity 8 is open to the second port opening 4. The outer cylindrical wall 9 and the inner cylindrical wall 10 of the annular cylindrical cavity 7 include a plurality of shallow grooves disposed in a direction parallel to the central axis of the annular cylindrical cavity 7, providing a plurality of circular cylindrical seating surfaces 11, 12, etc. which rotatably receives and retain a plurality of rotary closure members 13, 14, etc. of tubular construction. Each of the plurality of the rotary closure members 13, 14, etc. includes at least one hole 15 disposed through the tubular wall thereof, that lines up with one of a plurality of holes or nozzles 16, 17, etc. disposed through the inner cylindrical wall 10 when the rotary closure member is rotated to the open position. Each of the plurality of the orifices 16, 17, etc. disposed through the inner cylindrical wall 10 is provided with resilient annular seals 18, 19, etc. installed in a groove disposed in the outer cylindrical surface of the inner cylindrical wall 10 and encircling the orifices or nozzles 16, 17, etc., respectively, which resilient annular seals provide a leak-proof barrier intermediate the annular cylindrical cavity 7 and the inner cylindrical cavity 8.

Figure 2:
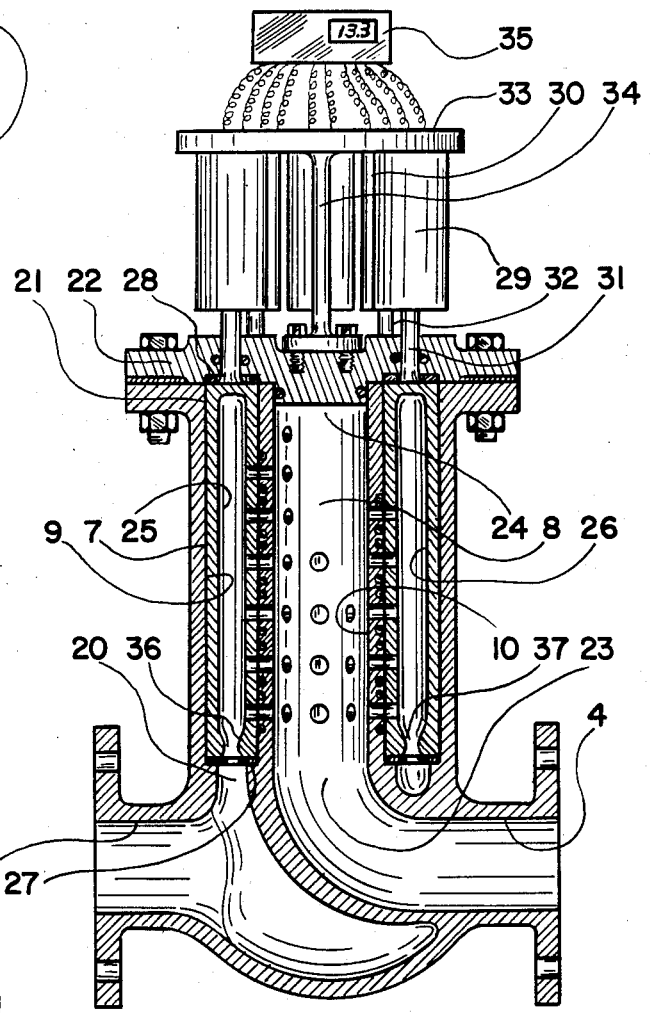
FIG. 2 illustrates another cross section of the stepper control valve shown in FIG. 1.

In FIG. 2 there is illustrated another cross section of the multiple orifice stepper control valve shown in FIG. 1, which cross section is taken along plane 2—2 as shown in FIG. 1. One extremity 20 of the annular cylindrical cavity 7 is open to the first port opening 2, while the other extremity 21 is H sealed in a leak-proof manner by the cap 22. One extremity 23 of the inner cylindrical cavity 8 is open to the second port opening 4, while the other extremity 24 is sealed in a leak-proof manner by the cap 22. The plurality of the rotary closure members of tubular construction 25, 26, etc. in continuation of 13, 14, etc. shown in FIG. 1 are rotatably disposed and retained intermediate the outer cylindrical wall 9 and the inner cylindrical wall 10 by means of the circular cylindrical seats as shown in FIG. 1 and by means of the washers 27, 28, etc., respectively disposed at the two extremities of the rotary closure member, which function as a seal or thrust bearing, or combination thereof depending different designs of the multiple orifice stepper control valves, which designs and functions thereof will be described after completing the description of FIG. 2. Each of the plurality of rotary closure members is kinermatically linked to each of the plurality of rotary actuators 29, 30, etc., by means of each of the plurality of actuator rods 31, 32, etc. extending from one extremity of each of the rotary closure members, which engage and extend through holes included in the cap 22 in a rotatable and leak-proof relationship. The plurality of the rotary actuators 29, 30, etc. secured to a holder plate 33 secured to the cap 22 by a spacer member 34 are controlled by a controller 35, which activates a specified combination of the rotary actuators according to a command input to the controller 35 and rotates the specified combination of the rotary closure members to the open position wherein the holes disposed through the tubular wall of the rotary closure member lines up with the orifices or nozzles disposed through the inner cylindrical wall 10.

The multiple orifice stepper control valve illustrated in FIGS. 1 and 2 can be constructed in two different designs. In the first design, the elements controlling the flow through the multiple orifice stepper valve are the orifices or nozzles 16, 17, etc. disposed through the inner cylindrical wall 10 as shown in FIG. 1, wherein the inside diameter of the rotary closure members 13, 14, etc. must be large enough to provide a substantially free flow passage of negligibly small flow restrictions compared with the orifices or nozzles disposed through the inner cylindrical wall 10. In the aforementiond design, the orifice or nozzle 36, 37, etc., included at the open inlets of the rotary closure members 25, 26, etc., as shown in FIG. 2 do not serve any purpose and, consequently, should be omitted. Of course, in the aforementioned design the amount of the flow rate flowing from the port opening 2 to the port opening 4 or vice versa, is simply preportional to the total number of the orifices or nozzles disposed across the inner cylindrical wall 10, which are opened by the controller 35. When orifices or nozzles of more than one single size disposed across the inner cylindrical wall 10 are employed, the total fluid flow through the stepper control valve is obtained by adding the fluid flows through individual orifices or nozzles disposed through the inner cylindrical wall 10, which are opened by the controller 35, wherein the algorithm of adding the fluid flows through the individual orifices or nozzles may be performed by a micro computer receiving input data from the controller 35. It should be mentioned that, in the aforementioned design of the multiple orifice stepper control valve, the holes through the tubular wall 15, etc. as shown in FIG. 1 have to be sized significantly greater than the orifices or nozzle 16, etc. disposed through the inner cylindrical wall 10. It is recommended to include the holes through the tubular wall of the rotary closure member in two rows parallel to the central axis of the rotary closure member of 90 degree separation as shown in FIG. 1 wherein the holes of the first of the two rows provide flow passages across the inner cylindrical wall 10 while the holes of the second of the two rows open up the inner cylindrical zone within the rotary closure members to the annular zone intermediate two adjacent rotary closure members, providing a increased flow passages.

In the second design, the elements controlling the flow through the multiple orifice stepper controll valve are the orifices or nozzles 36, 37, etc. included at the inlet of the rotary closure members as illustrated in FIG. 2, wherein there should be included a sufficient number of holes through the tubular wall of each rotary closure member and a sufficient number of holes disposed through the inner cylindrical wall 10 for each rotary closure member, whereby the flow restriction is provided solely by the inlet orifices or inlet nozzles 36, 37, etc. as shown in FIG. 2. The size of the inlet orifices or inlet nozzles 36, 37, etc. may be uniform or may vary from one rotary closure member to the other. The total fluid flow from the port opening 2 to the port opening 4 or vice versa is proportional to the total number of the rotary closure members rotated to the open position by the controller 35 when the size of the inlet orifices or inlet nozzles 36, 37, etc. are the same. If the size of the inlet orifices or inlet nozzles 36, 37, etc. are not uniform, the total fluid flow is obtained by adding fluid flows through individual inlet orifices or inlet nozzles, which algorithm is carried out by a micro process or taking input signals from the controller 35.

Figure 3:
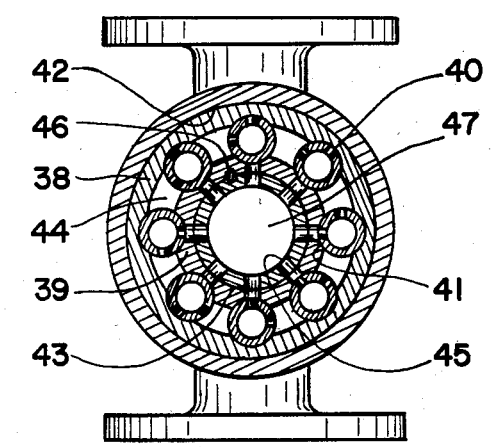
FIG. 3 illustrates a cross section of another embodiment of the stepper control valve.

In FIG. 3 there is illustrated a cross section of another embodiment of the multiple orifice stepper control valve, which cross section is equivalent to that shown in FIG. 1. In this embodiment, a pair of resilient tubular sleeves 38 and 39 respectively including a series of circular cylindrical seats 40, etc. and 41, etc. are disposed adjacent to the outer cylindrical wall 42 and the inner cylindrical wall 43 of the annular cylindrical cavity 44 in a intimately contacting relationship, respectively. Of course, the orifices or nozzles 45, etc. disposed across the inner cylindrical wall 43 are extended across the inner resilient tubular sleeve 39, which is keyed to the inner cylindrical wall 43 by the combination of a key and key way in order to maintain the proper alignment of the holes providing the flow passages intermediate the annular cylindrical cavity 44 and the inner cylindrical cavity 47. The resilient tubular sleeves 38 and 39 play the dual role of bearing and resilient seal in rotatably supporting and retaining the rotary closure members. The multiple orifice stepper control valves may be constructed in two different designs as described in conjunction with FIGS. 1 and 2.

Figure 4:
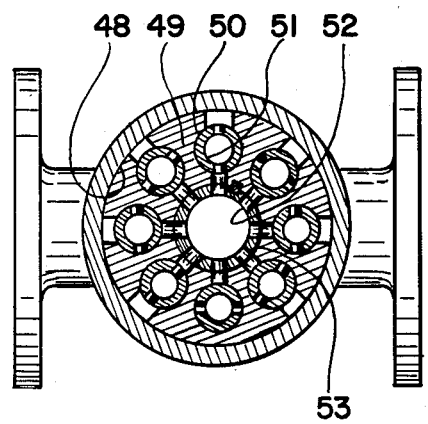
FIG. 4 illustrates a cross section of a further embodiment of the stepper control valve.

In FIG. 4 there is illustrated a cross section of a further embodiment of the multiple orifice stepper control valve. In this embodiment, the annular cylindrical cavity 48 is filled with a hollow cylindrical member 49 made of a resilient material, which includes a plurality of circular cylindrical holes 50, etc. respectively receiving a plurality of the rotary closure members 51, etc. in a leak-proof intimate relationship. The radially outer portion of the circular holes 50, etc. are cut open to the outer cylindrical surface of the hollow cylindrical member 49, which arrangement enables one to preload the seating pressure in installing the rotary closure members 51, etc. within the hollow cylindrical member 49. The orifices or nozzles 52, etc. disposed through the inner cylindrical wall 53 are extended to the inner cylindrical surfaces of the holes 50, etc. receiving and retaining the rotary closure members 51, etc. Each rotary closure member may be provided with two diametrically opposite rows of holes disposed through the tubular wall thereof, wherein the first row of the two rows of holes line up with the orifices or nozzles 52 disposed across the inner cylindrical wall 53, while the second row of the two rows of holes opens up the inner cylindrical zone within the rotary closure members to the cut extending therefrom to the outer cylindrical wall 48, providing flow passages of increased cross section area. The multiple orifice stepper control valve shown in FIG. 4 may be designed in two different ways as described in conjunction with FIGS. 1 and 2.

While the principles of the present invention have now been made clear by the illustrated embodiments, it will be immediately obvious to those skilled in the art many modifications in the structures, arrangements, proportions, elements and materials which are particularly adapted to the specific working environments and operating conditions in the practice of the invention without departing from those principles.

I claim:
1. A multiple orifice stepper control valve comprising in combination:
 (a) a valve body including a first port opening open to one extremity of said valve body and a second port opening open to the other extremity of said valve body;

(b) a structural extension included in said valve body intermediate said one and the other extremities, said structural extension including an annular cylindrical cavity with one extremity open to said first port opening and the other extremity opposite to said one extremity closed by a capping member, and further including an inner cylindrical cavity disposed substantially coaxially with respect to said annular cylindrical cavity wherein one extremity of said inner cylindrical cavity is open to said second port opening and the other extremity opposite to said one extremity is closed by a capping member;

(c) a plurality of orifices disposed through inner cylindrical wall of said annular cylindrical cavity separating said annular cylindrical cavity from said inner cylindrical cavity, said plurality of orifices disposed in a plurality of rows parallel to the central axis of said inner cylindrical cavity wherein each of said plurality of rows includes at least one of said orifices;

(d) a plurality of rotary closure members of tubular construction with one extremities open to said first port opening rotatably disposed and retained in a plurality of circular cylindrical seats distributed within said annular cylindrical cavity, respectively, each of said plurality of circular cylindrical seats including a first concave circular cylindrical seating surface included in inner cylindrical surface of said annular cylindrical cavity wherein each of said plurality of rows of said plurality of orifices is disposed substantially on the end of said first concave circular cylindrical seating surface closer to the one extremity of the valve body, and a second concave circular cylindrical seating surface included in outer cylindrical surface of said annular cylindrical cavity, each of said plurality of rotary closure members of tubular construction including at least one row of orifices wherein said at least one row of orifices includes at least one orifice disposed through tubular wall of said rotary closure member, the orifices included in said at least one row of orifices respectively lining up with the orifices disposed through said inner cylindrical wall at the end of the first concave circular cylindrical seating surface closer to the one extremity of the valve body when said each of said plurality of rotary closure members is rotated to open position;

(e) a plurality of rotary actuator rods respectively connected to the extremities of said plurality of rotary closure members opposite to said one extremities open to said first port opening and rotatably engaging and extending through a plurality of holes disposed through said capping member closing said the other extremity of said annular cylindrical cavity in a leak-proof manner;

whereby the rotation of different combinations of said plurality of rotary closure members to open position allows fluid medium flowing through said multiple orifice stepper control valve to flow at different flow rates wherein said flow rates can be varied from zero to a maximum flow rate.

2. The combination as set forth in claim 1 wherein flow through said multiple orifice stepper control valve is controlled by controlling the number of open orifices among said plurality of orifices disposed through inner cylindrical wall of said annular cylindrical cavity.

3. The combination as set forth in claim 2 wherein said combination includes a plurality of means for respectively rotating said plurality of rotary actuator rods.

4. The combination as set forth in claim 3 wherein said combination includes a controller controlling said plurality of means for respectively rotating said plurality of rotary actuator rods.

5. The combination as set forth in claim 2 wherein a plurality of resilient annular seals are respectively installed in a plurality of annular grooves included in said inner cylindrical surface of said annular cylindrical cavity around said plurality of orifices disposed through said inner cylindrical wall of said annular cylindrical cavity, respectively, providing a leak-proof interface between said inner cylindrical surface of said annular cylindrical cavity and external cylindrical surfaces of said plurality of rotary closure members.

6. The combination as set forth in claim 5 wherein said combination includes a plurality of means for respectively rotating said plurality of rotary actuator rods.

7. The combination as set forth in claim 6 wherein said combination includes a controller controlling said plurality of means for respectively rotating said plurality of rotary actuator rods.

8. The combination as set forth in claim 2 wherein said first concave circular cylindrical seating surface included in said inner cylindrical surface of said annular cylindrical cavity is included in a cylindrical sleeve made of a resilient material lining outer cylindrical surface of said inner cylindrical wall of said annular cylindrical cavity.

9. The combination as set forth in claim 8 wherein said combination includes a plurality of means for respectively rotating said plurality of rotary actuator rods.

10. The combination as set forth in claim 9 wherein said combination includes a controller controlling said plurality of means for respectively rotating said plurality of rotary actuator rods.

11. The combination as set forth in claim 1 wherein said one extremities of said plurality of rotary closure members of tubular construction open to said first port opening include a plurality of flow restricting orifices, respectively, wherein flow through said multiple orifice stepper control valve is controlled by controlling the number of said flow/restricting orifices allowing fluid flow therethrough.

12. The combination as set forth in claim 11 wherein said combination includes a plurality of means for respectively rotating said plurality of rotary actuator rods.

13. The combination as set forth in claim 12 wherein said combination includes a controller controlling said plurality of means for respectively rotating said plurality of rotary actuator rods.

14. The combination as set forth in claim 11 wherein a plurality of resilient annular seals are respectively installed in a plurality of annular grooves included in said inner cylindrical surface of said annular cylindrical cavity around said plurality of orifices disposed through said inner cylindrical wall of said annular cylindrical cavity, respectively, providing a leak-proof interface between said inner cylindrical surface of said annular cylindrical cavity and external cylindrical surfaces of said plurality of rotary closure members.

15. The combination as set forth in claim 14 wherein said combination includes a plurality of means for respectively rotating said plurality of rotary actuator rods.

16. The combination as set forth in claim 15 wherein said combination includes a controller controlling said plurality of means for respectively rotating said plurality of rotary actuator rods.

17. The combination as set forth in claim 11 wherein said first concave circular cylindrical seating surface included in said inner cylindrical surface of said annular cylindrical cavity is included in a cylindrical sleeve made of a resilient material lining outer cylindrical surface of said inner cylindrical wall of said annular cylindrical cavity.

18. The combination as set forth in claim 17 wherein said combination includes a plurality of means for respectively rotating said plurality of rotary actuator rods.

19. The combination as set forth in claim 18 wherein said combination includes a controller controlling said plurality of means for respectively rotating said plurality of rotary actuator rods.

* * * * *